US008235803B2

(12) United States Patent
Loose et al.

(10) Patent No.: US 8,235,803 B2
(45) Date of Patent: Aug. 7, 2012

(54) GAMING MACHINES WITH NORMALIZED POWER CONSUMPTION

(75) Inventors: Timothy C. Loose, Chicago, IL (US); Gene Rigsby, Libertyville, IL (US)

(73) Assignee: WMS Gaming Inc., Waukegan, IL (US)

( * ) Notice: Subject to any disclaimer, the term of this patent is extended or adjusted under 35 U.S.C. 154(b) by 632 days.

(21) Appl. No.: 12/410,950

(22) Filed: Mar. 25, 2009

(65) Prior Publication Data

US 2009/0253495 A1 Oct. 8, 2009

Related U.S. Application Data

(60) Provisional application No. 61/072,754, filed on Apr. 2, 2008.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |
| ***G06F 1/00*** | (2006.01) |
| ***H02J 7/00*** | (2006.01) |

(52) U.S. Cl. ............... 463/25; 463/1; 713/323; 320/167

(58) Field of Classification Search ................ 463/1, 24, 463/25, 40, 42; 713/300–340; 320/166, 320/167

See application file for complete search history.

(56) References Cited

U.S. PATENT DOCUMENTS

| | | | | |
|---|---|---|---|---|
| 4,642,535 | A | 2/1987 | Hucker | |
| 5,754,868 | A | 5/1998 | Yamamoto et al. | |
| 6,357,011 | B2 | 3/2002 | Gilbert | |
| 6,611,917 | B1 | 8/2003 | Yahara | |
| 7,085,939 | B2 | 8/2006 | Cabezas et al. | |
| 7,254,723 | B1 * | 8/2007 | Favey et al. | 713/300 |
| 2003/0064815 | A1 | 4/2003 | Burnside et al. | |
| 2005/0149773 | A1 * | 7/2005 | Kevan | 713/320 |
| 2007/0145952 | A1 * | 6/2007 | Arcena | 320/135 |
| 2008/0070652 | A1 | 3/2008 | Nguyen et al. | |

FOREIGN PATENT DOCUMENTS

WO WO 2007/081402 A1 7/2007

* cited by examiner

*Primary Examiner* — Ha Tran T Nguyen
*Assistant Examiner* — Karen Kusumakar
(74) *Attorney, Agent, or Firm* — Nixon Peabody LLP

(57) ABSTRACT

An exemplary power manager is adapted to supply power from a power supply to a first component of a gaming machine. The first component consumes a larger amount of current during a second time interval than during a first time interval, where the first component alternates between the first and second time intervals during operation. A rechargeable energy storage device is used to supply a substantial portion of the current to the first component during the second time interval from energy stored in the energy storage device prior to the start of the second time interval. This causes the current supplied from the power supply to the power manager during the second time interval to be less than the total current required by the first component during the second time interval and thus reduces the peak current load of the power supply during the second time interval.

14 Claims, 5 Drawing Sheets

| | Ie | Ic | Ip | Vp |
|---|---|---|---|---|
| T1 CHARGED STEADY STATE | 0.5A | 0A | 0.5A | 24V |
| T2 START PRINTER JOB | 1.77A | −4.23A | 6A | 24V |
| T3 AT COMPLETION OF PRINTER JOB | 1.77A | −4.23A | 6A | 20V |
| T4 RECHARGING TO STEADY STATE | 1.77A | 1.27A | 0.5A | 20V |
| T5 RECHARGED TO STEADY STATE | 0.5A | 0A | 0.5A | 24V |

GAMING MACHINES WITH NORMALIZED POWER CONSUMPTION

CROSS-REFERENCE TO RELATED APPLICATION

This application claims the benefit of U.S. Provisional Application Ser. No. 61/072,754, filed Apr. 2, 2008, entitled "Gaming Machines with Normalized Power Consumption."

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

The present invention relates generally to gaming machines and methods for operation of gaming machines, and more particularly to managing the power consumption of a gaming machine.

Gaming machines, such as slot machines, video poker machines and the like, have been a cornerstone of the gaming industry for several years. Generally, an organization, e.g. a casino, which offers such games for players, will provide a substantial number of gaming machines in order to provide play for a plurality of players.

The number of gaming machines that can be powered by one AC electric circuit is dependent on the power consumption load presented by gaming machines to be operated on the circuit. It is desirable to operate as many gaming machines as can be safely accommodated on each AC electric circuit in order to minimize the number of circuits required. Because the power consumed by a gaming machine varies depending on the components of the gaming machine that are being utilized, gaming machine power consumption is typically rated in amperes for a nominal operation voltage, i.e. 120 VAC, where the rating takes into account the maximum current that could be utilized during operation. Hence the peak power consumption of gaming machines determines the number of gaming machines that can be supported by each AC electric circuit.

SUMMARY

It is an object of the present invention to provide improved power management for gaming machines.

An exemplary power manager is adapted to supply power from a power supply to a first component of a gaming machine. The first component consumes a larger amount of current during a second time interval than during a first time interval, where the first component alternates between the first and second time intervals during operation. A rechargeable energy storage device is used to supply a substantial portion of the current to the first component during the second time interval from energy stored in the energy storage device prior to the start of the second time interval. This causes the current supplied from the power supply to the power manager during the second time interval to be less than the total current required by the first component during the second time interval and thus reduces the peak current load of the power supply during the second time interval.

This invention further includes a gaming machine that incorporates an embodiment of a power manager.

This invention further includes a method for normalizing power supplied from a power supply to a component of a gaming machine.

DESCRIPTION OF THE DRAWINGS

Features of exemplary implementations of the invention will become apparent from the description, the claims, and the accompanying drawings in which:

DETAILED DESCRIPTION

Figure 1:
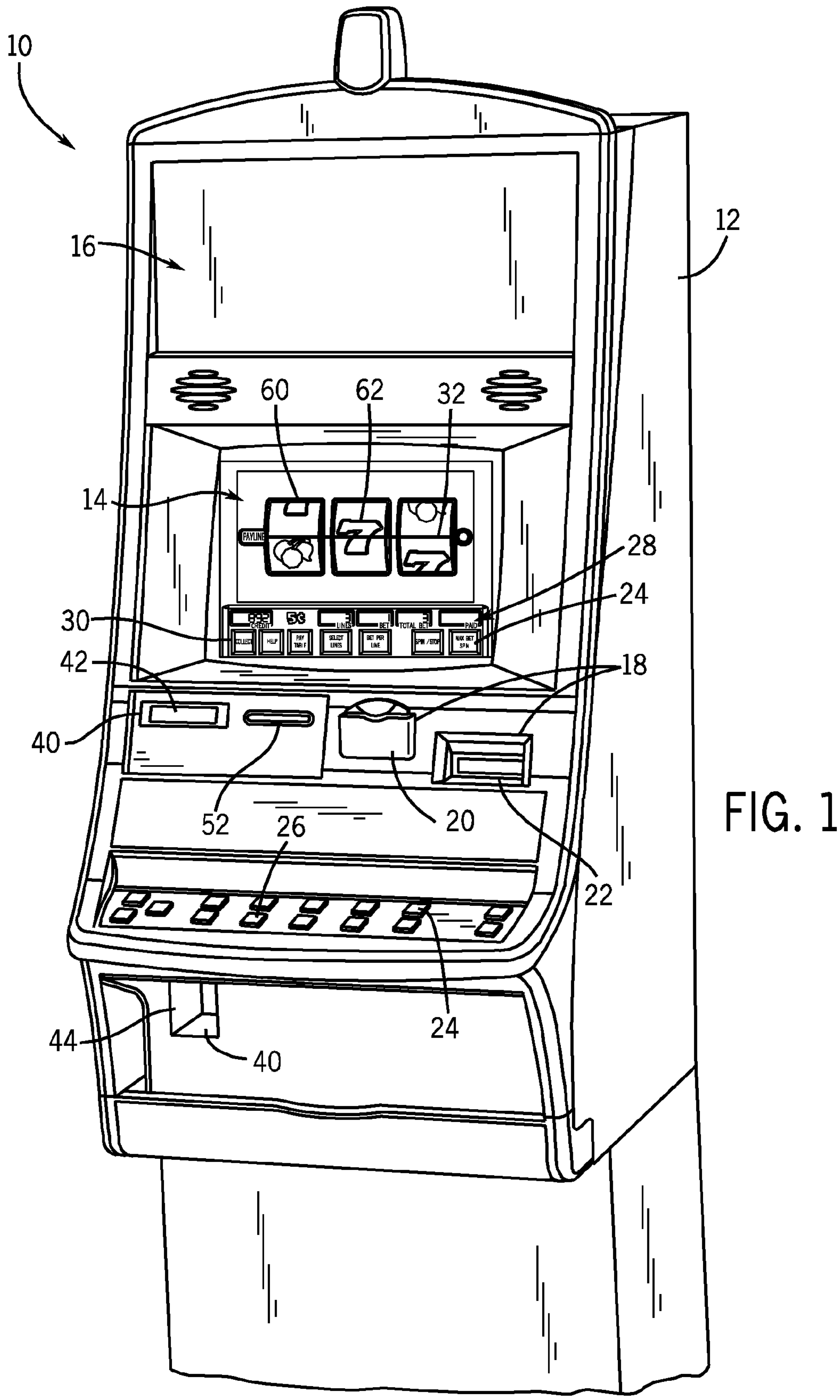
FIG. 1 illustrates an exemplary gaming machine in accordance with the present invention.

One aspect of the present invention resides in the recognition of the difficulties associated with the variability of power (current) consumed by a gaming machine during its operation. Typically, the maximum input current is drawn by the gaming machine only intermittently when a certain set of conditions occur. For example, during normal game play a nominal X amperes of current is required by its power supply to operate the various components of the gaming machine. However, during certain conditions, additional current beyond the X amperes is required in order to power certain components operated intermittently, e.g. operation of a thermal printer to generate a print out a player's account value, operation of a mechanical coin input reader/coin output dispenser, etc. One aspect of the present invention resides in the recognition that by reducing the maximum input current required to be generated by the gaming machine's power supply during such intermittent conditions, the current rating of the gaming machine (based on maximum input current needs) can be reduced thereby resulting in the ability of operate more gaming machines on one AC electric circuit. Similarly, components of the power supply, e.g. the transformer, etc., can be employed that have lower maximum current handling capabilities.

This invention can be implemented in many different forms. There is shown in the drawings and described herein preferred embodiments of the invention with the understanding that the present disclosure is to be considered as an implementation of the principles of the invention and is not intended to limit the broad aspect of the invention to the embodiments illustrated.

Referring to FIG. 1, an exemplary gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. The gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency. Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display a bonus game associated with the basic wagering game. The primary display 14 may include a plurality of mechanical reels 60 to display the outcome of the wagering game. More specifically, the mechanical reels 60 each bear a plurality of symbols 62 positioned around the periphery of the reels 60. Winning combinations of symbols 62 landing on at least one payline 32 are awarded in accordance with a paytable. Alternatively, the primary display 14 may take the form of a cathode ray tube (CRT), a high resolution LCD, a plasma display, an LED, or any other type of display suitable for use in the gaming machine 10. In the illustrated embodiment, the gaming machine 10 is an "upright" version in which the primary display 14 is oriented vertically relative to the player. Alternatively, the gaming machine may be oriented at different angles toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her identity. The player information reader 52 is shown in FIG. 1 as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 2:
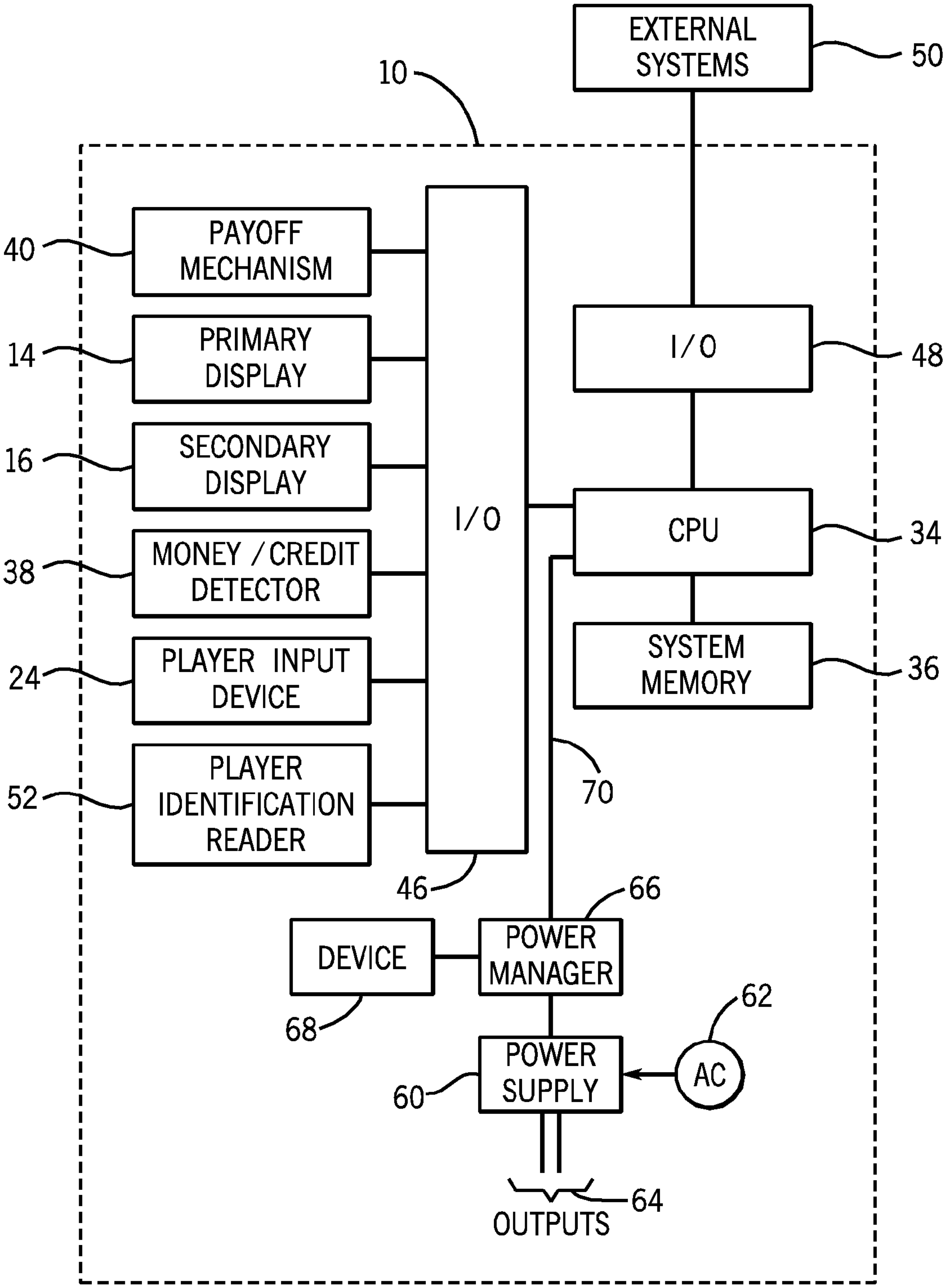
FIG. 2 is a block diagram of the exemplary gaming machine of FIG. 1.

Referring to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and other components by input/output circuits 46 and 48. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also coupled to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. The payoff mechanism 40 may include both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through the input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path. The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36.

A power supply 60 receives input power from an AC power source 62 such as commercial AC power and provides a plurality of DC and/or AC power outputs 64 coupled to the various components and circuits of the gaming machine. The power supply 60 also provides a DC power output that is connected to the power manager 66. In accordance with an embodiment of the present invention, the power manager 66 supplies power to device 68 which is preferably a component of the gaming machine with power demands that cycle. In this illustrative embodiment, device 68 is a thermal printer that functions as part of the payout mechanism 40. As will be explained in more detail below, the exemplary thermal printer is designed to operate at 24 volts DC and requires substantially more DC current while actually printing than while being ON but awaiting a print job. It is a general objective of the power manager 66 to mitigate the additional DC current required to be supplied by the power supply 60 to the printer while it is printing a job, thereby reducing the peak current rating of the power supply 60 and likewise reducing the peak input AC current required from the AC power source 62. The power manager 66 may advantageously service one or more types of devices 68 which intermittently require increased amounts of power, e.g. increased amounts of the DC current. For example, an electromechanical device, e.g. money/coin dispensing or receiving mechanism or a printer, which requires increased amounts of current during an operation involving a physical movement could be advantageously supplied power (current) via the power manager 66. A line 70 is used to transmit a fault detection signal generated by the power manager 66 to the CPU 34.

Figure 3:
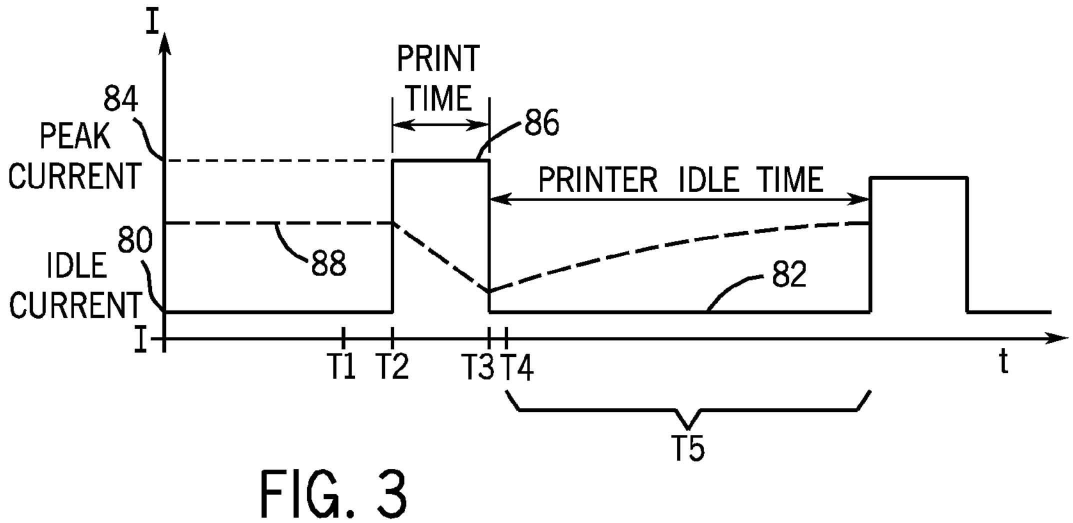
FIG. 3 is a graph illustrating an intermittent power demand associated with an exemplary component of the exemplary gaming machine.

FIG. 3 is a graph of current versus time illustrating the intermittent power demands of the exemplary thermal printer. A nominal amount of idle current 80 is required by the printer during an idle time 82, i.e. times during which the printer is ON and ready to receive a print job, but not engaged in printing. A peak amount 84 of current is required by the printer during a print time 86 when the printer is engaged in printing. In this illustrative example an idle time of 10 seconds exists between print jobs which last approximately 3 seconds. The idle time can be controlled by the CPU 34 such as by restricting the interval between print jobs to be not less than a predetermined time.

The dotted line 88 represents voltage, not to scale, delivered to the printer during a printing cycle where the voltage drop during the print time 86 is exaggerated. The voltage drop is due to the discharge of an energy storage device, e.g. an ultra capacitor, during the print time 86 wherein the ultra capacitor contributes a substantial portion of the current used by the printer during the print time. As explained below the ultra capacitor is sized so that the lowest voltage at the end of a print time 86 remains above the predetermined voltage threshold set by the voltage monitor 98, and within the printer's rated voltage range for operation. The times T1-T5 will be explained in conjunction with the chart of FIG. 5.

Figure 4:
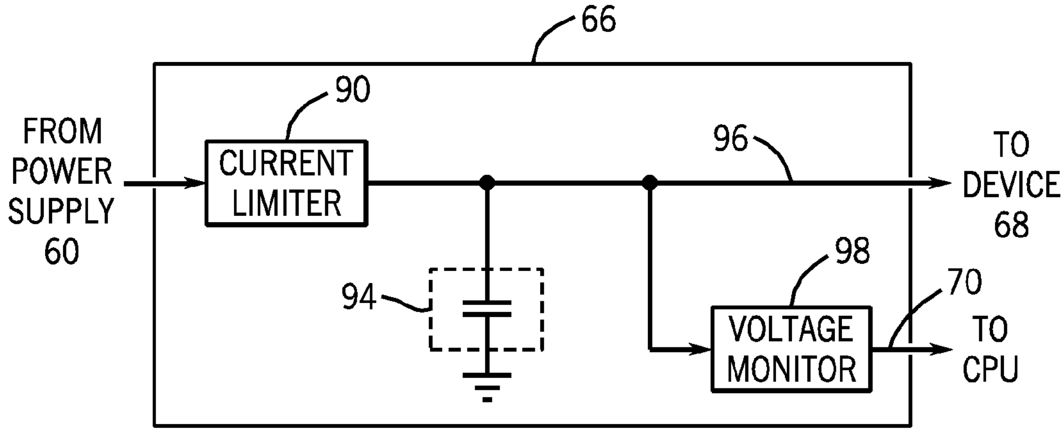
FIG. 4 is a block diagram of the power manager of FIG. 1.

FIG. 4 shows a high level circuit diagram of the power manager 66 so that a general explanation of its operation can be more readily understood. A current limiter 90 receives a source of DC power from the power supply 60 and regulates the amount of DC current that flows toward an ultra capacitor 94 and over line 96 to the device 68. As used herein an "ultra capacitor" means an electrochemical energy storage device in which chemical reactions do not take place during operation such that energy is stored electrostatically at an electrode/electrolyte interface. A voltage monitor 98 is also coupled to the line 96 and functions to monitor the DC voltage delivered to the device 68. If this voltage drops below a predetermined threshold, the voltage monitor 98 will change the binary state of output line 70 from one state to the other state as a signal to the CPU 34 that an under voltage condition exists. If the CPU senses such a signal before starting to print a ticket, it will pause the print operation until the under voltage condition ceases.

During a steady-state condition of power manager 66 prior to the beginning of a print time 86 for the printer, the ultra capacitor 94 will be fully charged and hence little current will be flowing into the ultra capacitor from the current limiter 90. During this condition the current limiter 90 is supplying the idle current required for the operation of the printer. During an active printing mode, the current supplied by the current limiter 90 increases but not to a level that would furnish all the current required by the printer. The remainder of the current needed by the printer during the print time is supplied by the ultra capacitor. During the active printing mode, the ultra capacitor 94 is in a state of discharge, i.e. it is supplying current to the printer and the voltage across the ultra capacitor begins to decay. The current supplied by the ultra capacitor 94 in combination with the current supplied from the current limiter 90 equals the total current required by the thermal printer 68 during the printing mode.

The amount of capacitance of the ultra capacitor 94 is selected so that it is capable of supplying its portion of the required current during the print time 86 without its voltage falling below a value within the operating voltage range of the printer. During the print time 86, it is acceptable for the DC voltage presented to the printer to slowly decrease as long as the DC voltage remains above the voltage range that the printer is rated for operation. Many devices are able to operate over a range of input voltages. Thus, the power manager 66 can be advantageously used to manage the power delivered to a variety of such devices. Immediately following the print time 86, the current limiter 90 supplies more current than the idle current required by the printer with the excess current flowing into ultra capacitor 94 to recharge it back to its steady-state voltage level. The rate of charge of the ultra capacitor and the minimum printer idle time 82 is such that the ultra capacitor is recharged to its steady-state voltage prior to the next occurrence of a print time 86.

Figures 5, 6:
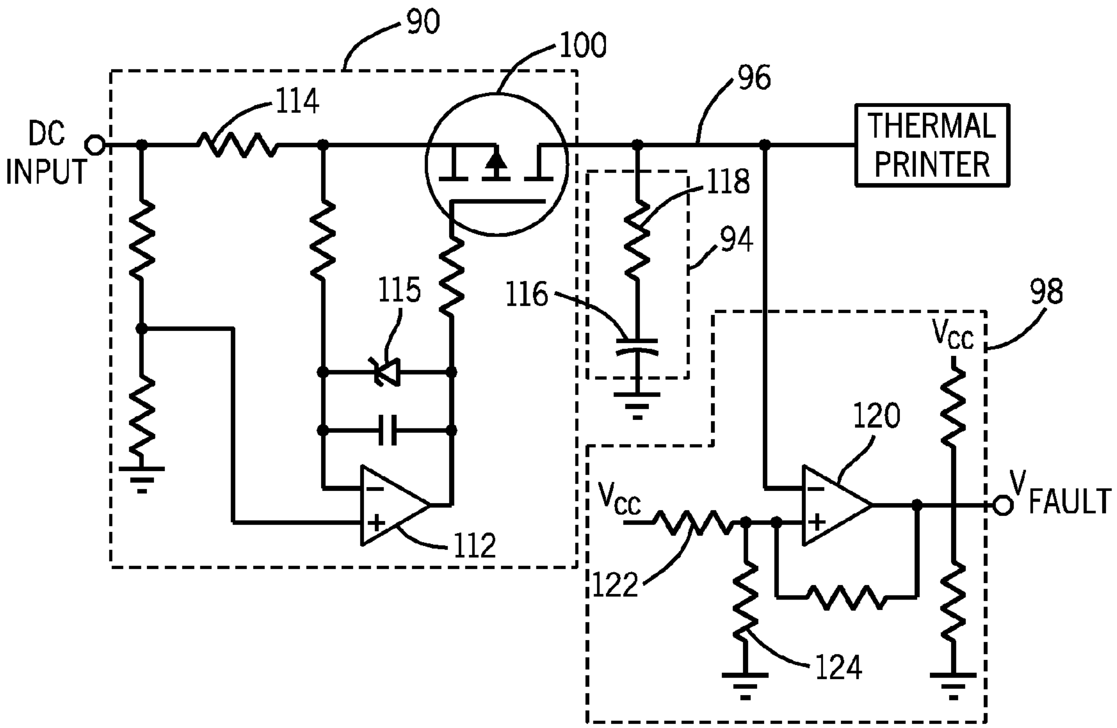
FIG. 5 is a chart of illustrative values associated with the operation of the power manager.
FIG. 6 is a schematic diagram of an exemplary power manager.

FIG. 5 is a chart showing representative voltage and current levels for an illustrative example. Column I (e) is the current flowing from current limiter 90; column I (c) is the current flowing into ultra capacitor 94; column I (p) is the current flowing to the printer; column V (p) is the voltage delivered to the printer. Row 100 is at a time T1 which is a steady state during a printer idle time in which the ultra capacitor is fully charged. Row 102 is at a time T2 at the beginning on a print time. Row 104 is at a time T3 at the end of a print time. Row 106 is at a time T4 immediately following the end of a print time at the start of a printer idle time. Row 108 is at a time T5 in which the system has returned to its steady-state condition as at time T1. It will be apparent from the chart that during a print time 86 the current I(c) to ultra capacitor 94 is −4.23 amperes, i.e. current is flowing out of the capacitor towards the printer. As seen in column V (p) the voltage delivered to the printer reaches its lowest level of 20.0 volts at the end of the print time due to the discharging of the ultra capacitor.

The following equation 1 defines the relationship between capacitance (C), voltage (V) and time (t) assuming a constant current (Ic) at the capacitor.

$$Ic=C*\Delta V/\Delta t \qquad \text{Eq. 1}$$

The following equation 2 solves equation 1 for capacitance for the change in voltage (start voltage Vs−end voltage Vt) at the capacitor over the print time (Tp) for the current supplied by the capacitor.

$$C=Ic*Tp/(Vs-Vt) \qquad \text{Eq. 2}$$

The amount of current to be provided by the current limiter 90 (Ie) during a recharge of the capacitor during printer idle time is defined by equation 3.

$$Ie=((Ii*Ti)+(Ip*Tp))/(Ti+Tp) \qquad \text{Eq. 3}$$

where Ii is current during idle time Ti, Ip is current during print time Tp.

Equation 4 is used to define the threshold of the printer voltage (Vth) after recharging during a printer idle time interval. Vth is set to the minimum capacitor voltage that will allow a print time to occur without the capacitor voltage falling below the minimum voltage allowed by the printer.

$$Vth=V(\text{low})+((Ip-Ie)*Tp/C) \qquad \text{Eq. 4}$$

where V(low) is the voltage at the end of the print time.

Using the above equations and the following exemplary conditions, parameters for the power manager 66 can be determined. A nominal steady-state voltage at the printer is 24 V with an acceptable low-voltage of 20 V at the end of a print time. A minimum idle time is 10 seconds and a printing time is 3 seconds. The current required by the printer during an idle condition is 0.5 ampere and is 6 amperes during the printing time.

The amount of current (Ie) from the current limiter during print time and recharge following a print time is:

$$\begin{aligned} Ie &= ((Ii*Ti)+(Ip*Tp))/(Ti+Tp) \\ &= ((.5*10\text{ sec})+(6*3\text{ sec}))/(10\text{ sec}+3\text{ sec}) \\ &= 1.77\text{ amperes} \end{aligned}$$

For the value of the ultra capacitor:

$$\begin{aligned} C &= Ic*Tp/(Vs-Vt) \\ &= (6\text{ A}-1.77\text{ A})*3\text{ sec}/(24\text{ V}-20\text{ V}) \\ &= 3.17\text{ farads, rounded up to 3.5 farads as a conventional value} \end{aligned}$$

For the voltage threshold at a time at the end of a recharge idle interval:

$$\begin{aligned} Vth &= V(\text{low})+((Ip-Ie)*Tp/C) \\ &= 20\text{ V}+((6\text{ A}-1.77\text{ A})*3\text{ sec}/3.5\text{ f} \\ &= 23.63\text{ V} \end{aligned}$$

Hence, the voltage sense level of the voltage monitor should be set to a lower value to accommodate some amount of tolerance, e.g. 23.4 V. If the voltage monitor provides the cpu with an under voltage binary signal at a time when it was desired to initiate a print time, the cpu will pause sending the print command until the under voltage signal is no longer presented, indicating that the ultra capacitor has sufficient charge to support the printer with the required voltage level during the print time.

In order to provide a substantial normalization benefit, it is desirable for the energy storing device of the power manager to supply a substantial portion of the additional current required during the cycle when the device 68 demands the most current. The portion of the additional current supplied by the energy storing device during the cycle when the device 68 demands the most current is preferably 25%-100% of the additional current, and more preferred at least 50% of the additional current. For the values in FIG. 5, the peak current drawn from the game power supply 24 VDC output is reduced from 6 A to 1.77 A, or 70%.

FIG. 6 is a schematic diagram of an exemplary power manager. The current limiter 90 utilizes a semiconductor device 110, e.g. a field effect transistor, to control the flow of current. A DC voltage source (not shown) supplies 24 V DC to the DC input terminal. An operational amplifier 112 has its output connected to the control input of the semiconductor device and provides a control voltage to the semiconductor device causing it to control the current flowing through it. A low value resistor 114 connected in series with the flow of current to the semiconductor device 110 from the DC voltage source provides a reference voltage to the operational amplifier 112 that is proportional to the current that is flowing.

The operational amplifier 112 output is proportional to the difference between the voltage at its plus and minus inputs. The plus input is essentially a fixed voltage; the minus input rises and falls as the current through the sense resistor 114 changes. If the current rises, the minus input falls, which causes the operational amplifier output to rise. The amplifier output rising changes the drive signal to device 110, which then lowers the current. In this way, a feedback mechanism is implemented to cause a limiting of the current through device 110. The values of the two resistors on the left of block 90 determine the value of the limited current through device 110. When the load (device 94 and the devices connected to line

96) cannot accept as much current as the limiter will allow, the operation amplifier 112 out will drop to a maximum level, determined by the zener diode 115. The zener diode keeps the operational amplifier operating in its linear region, and improves the transient response of the circuit.

The ultra capacitor 94 consists of a capacitor 116 in series with a very low value resistor 118, where this resistor models the internal wiring resistance and other effects within the ultra capacitor. The voltage monitor 98 utilizes a comparator 120 to sense the voltage at line 96 relative to a reference voltage at its positive input determined by the relative values of resistors 122 and 124. The output of comparator 120 provides a binary voltage level that changes state as the voltage on line 96 crosses the reference voltage level at its positive input.

Figure 7:
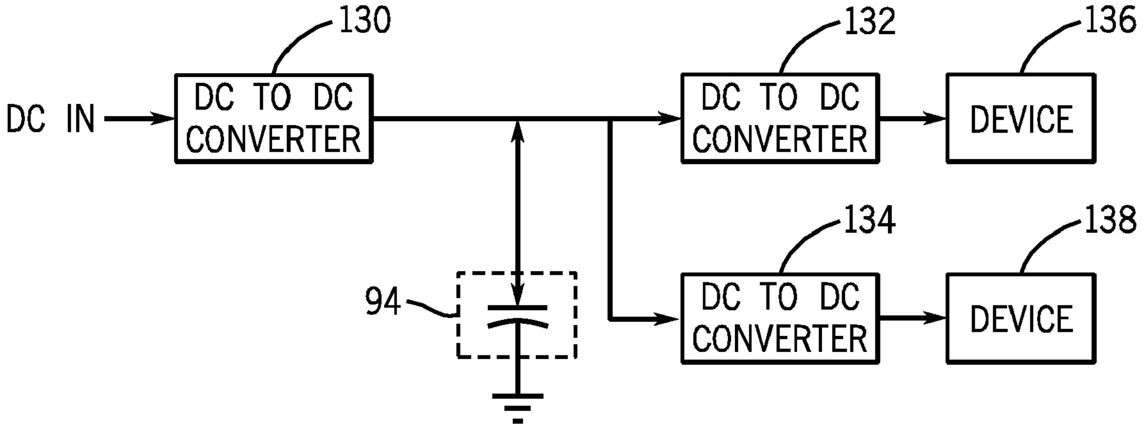
FIG. 7 is a block diagram of another embodiment of the present invention.

FIG. 7 is a block diagram of another exemplary embodiment of the present invention in which DC to DC converters are utilized. DC to DC converters 130, 132 and 134 may each be a switching mode DC to DC converter. Converter 130 receives a DC input voltage and preferably has a current limited input and provides a current limited output. The output of converter 130 supplies voltage and current to the energy storage device, ultra capacitor, 94 and the converters 132 and 134. Converter 132 preferably accepts a wide input voltage range and provides a predetermined DC output voltage, e.g. 24 V DC, to a device 136, e.g. a thermal printer. Converter 134 preferably accepts a wide input voltage range and provides another predetermined DC output voltage, e.g. 5 V DC, to a device 138, e.g. a computer motherboard. The energy storage device 94 functions as explained in the preceding embodiment serving to normalize the amount of input current supplied to converter 130 and to supply additional energy during times of peak current demands by device 136 and/or device 138.

A power manager with an energy storage device such as an ultra capacitor in accord with an embodiment of the present invention differs in unexpected ways as compared with using an ultra capacitor to power a common appliance such as a rechargeable cordless drill. It is desired to recharge such appliances as rapidly as possible so it will be ready for another use as soon as possible. A rapid recharge operation would itself generate a peak power demand due to large recharging current and hence is contrary to an objective of the present invention of normalizing power demand. Also, a rapid recharge operation for an appliance uses the maximum current that can be safely used by the ultra capacitor during recharging. This is contrary to limiting the amount of current to the ultra capacitor during the recharge cycle to achieve power normalization in accordance with the present invention.

Although exemplary implementations of the invention have been depicted and described in detail herein, it will be apparent to those skilled in the art that various modifications, additions, substitutions, and the like can be made without departing from the spirit of the invention. Any internal or external component of a gaming machine that operates with substantially varying power requirements during different operating conditions could advantageously utilize a power manager to normalize the power supplied to the component. "Normalizing" as used herein means to reduce value fluctuations away from an average value. A plurality of power managers could be utilized to supply power to different components. Alternatively, a single power manager could be configured to supply power to a plurality of different components.

Various types of controllable active devices could be utilized to provide a current limiting function. Although an ultra capacitor has been described as the energy storing device used to normalize the power supplied by the power supply, other types of energy storage devices could be utilized that are capable of storing and releasing energy within the cycle timing requirements of the device supplied with power. For example, an inductor or various types of rechargeable batteries could be utilized as the energy storing device. Although the power manager has been described as an internal component of the gaming machine, the power manager could be utilized as an external component of the gaming machine where the output of the power manager is connected to a served device of the gaming machine. In addition, an AC to DC power supply and a power manager could be integrated together to form a single component that could be housed as a single unit.

The scope of the invention is defined in the following claims.

What is claimed is:

1. A gaming machine that permits wagering on games comprising:

components that display visual indicia to a player, receive inputs from the player for making game selections during the games via the gaming machine, accept at least one of money and credits, and provide a payoff to the player;

a first component of the components that consumes first and second amounts of current during first and second time intervals, respectively, where the first component alternates between the first and second time intervals during operation, the second amount of current being at least twice the first amount of current;

a central processing unit (CPU) that controls operation of a game executed by the gaming machine and an operation of the first component;

a power supply that receives input power from an alternating current (AC) power source and supplies direct current for the first component;

a power manager, coupled to the CPU and coupled between the power supply and the first component, that supplies the first and second amounts of current to the first component, the power manager including a rechargeable energy storage device that supplies at least 25% of the second amount of current to the first component during the second time interval from energy stored in the energy storage device prior to the start of the second time interval so that the current supplied from the power supply to the power manager during the second time interval is less than the second amount of current, thereby reducing a peak current load of the power supply and correspondingly a peak current input from the AC power source during the second time interval to normalize the power supplied by the power supply, the power manager further including a voltage monitoring circuit that transmits a signal to the CPU indicative of whether the charge of the rechargeable energy storage device is sufficient to permit the CPU to initiate the second time interval, the CPU monitoring the charge of the rechargeable energy storage device, and pausing the operation of the first component and inhibiting initiation of the second time interval until the signal indicates that the charge of the rechargeable energy storage device is sufficient, and where the rechargeable energy storage device requires a recharging time interval during which it is being recharged with energy, the rechargeable energy storage device not supplying current during the second time interval to the first component until the recharging time interval has been completed, and where the rechargeable energy storage device includes an ultra capacitor.

2. The gaming machine of claim 1 wherein the power manager limits the current delivered by the power supply to the first component during the second time interval to a value less than 75% of the value of current received by the first component during the first time interval.

3. The gaming machine of claim 2 wherein the power manager includes a current limiter connected in series between the power supply and the first component, where the current limiter limits the current delivered by the power supply to the first component during the second time interval.

4. The gaming machine of claim 1 wherein the first component comprises an electromechanical device.

5. A power manager adapted to supply power from a power supply to a first component of a gaming machine that permits wagering on games, the power manager comprising:

the power supply receives input power from an alternating current (AC) power source;

a voltage monitoring circuit that transmits a signal to a central processing unit (CPU) that is coupled to the power manager and to the first component and that controls the operation of a game executed by the gaming machine;

the first component consumes first and second amounts of current during first and second time intervals, respectively, where the first component alternates between the first and second time intervals during operation of the gaming machine, the second amount of current being at least twice the first amount of current; and a rechargeable energy storage device that supplies at least 25% of the second amount of current to the first component during the second time interval from energy stored in the energy storage device prior to the start of the second time interval so that the current supplied from the power supply to the power manager during the second time interval is less than the second amount of current, thereby reducing a peak current input from the AC power source during the second time interval to normalize the power supplied by the power supply, the signal transmitted by the voltage monitoring circuit being indicative of whether the charge of the rechargeable energy storage device is sufficient to permit the CPU to initiate the second time interval, wherein the rechargeable energy storage device requires a recharging time interval during which it is being recharged with energy, the rechargeable energy storage device not supplying current during the second time interval to the first component until the recharging time interval has been completed, and wherein the rechargeable energy storage device includes an ultra capacitor.

6. The power manager of claim 5 further comprising a current limiter connected in series between the power supply and the first component, where the current limiter limits the current delivered by the power supply to the first component during the second time interval to a value less than 75% of the value of current received by the first component during the first time interval.

7. The power manager of claim 5 wherein the first component comprises an electromechanical device.

8. A power manager adapted to supply power from a power supply to a first component of a gaming machine that permits wagering on games, the power manager comprising:

means for receiving current from the power supply for the benefit of the first component where the latter consumes first and second amounts of current during first and second time intervals, respectively, where the first component alternates between the first and second time intervals during operation of the gaming machine, the second amount of current being at least twice the first amount of current, wherein the power supply receives input power from an alternating current (AC) power source;

an ultra capacitor that supplies at least 25% of the second amount of current to the first component during the second time interval from energy stored in the ultra capacitor prior to the start of the second time interval so that the current supplied from the power supply to the power manager during the second time interval is less than the second amount of current, thereby reducing a peak current input from the AC power source during the second time interval to normalize the power supplied by the power supply, where the ultra capacitor does not supply current during the second time interval to the first component until after a recharging time interval during which the ultra capacitor is being recharged with energy has been completed; and a voltage monitoring circuit that transmits a signal to a CPU indicative of whether the charge of the ultra capacitor is sufficient to permit the CPU to initiate the second time interval, where the CPU pauses the operation of the first component until the signal from the voltage monitoring circuit indicates that the charge of the ultra capacitor is sufficient, the CPU inhibiting initiation of the second time interval until the signal indicates that the charge of the ultra capacitor is sufficient.

9. The power manager of claim 8 further comprising a means for limiting current flowing from the power supply to the first component, the current limiting means limiting the current delivered by the power supply to the first component during the second time interval to a value less than 75% of the value of current received by the first component during the first time interval.

10. The power manager of claim 8 wherein the first component comprises an electromechanical device.

11. A method for normalizing the power delivered from a power supply to a first component of a gaming machine that permits wagering on games, the method comprising:

receiving direct current from the power supply for the benefit of the first component where the latter consumes first and second amounts of current during first and second time intervals, respectively, where the first component alternates between the first and second time intervals during operation of the gaming machine, the second amount of current being at least twice the first amount of current, wherein the power supply receives input power from an alternating current (AC) power source;

storing energy in a rechargeable energy storage device that supplies at least 25% of the second amount of current to the first component during the second time interval from energy stored in the energy storage device prior to the start of the second time interval so that the current supplied from the power supply to the power manager during the second time interval is less than the second amount of current, thereby reducing a peak current input from the AC power source during the second time interval to normalize the power supplied by the power supply;

monitoring voltage across the rechargeable energy storage device;

transmitting a signal to a central processing unit (CPU) indicative of whether the voltage across the rechargeable energy storage device is sufficient to permit the CPU to initiate the second time interval;

pausing the operation of the first component and inhibiting initiation of the second time interval until the signal indicates that the charge of the rechargeable energy storage device is sufficient; and defining a recharging time interval during which the rechargeable energy storage device is being recharged with energy where the rechargeable energy storage device is ready to supply current during the second time interval to the first component after the recharging time interval has been completed.

12. The method of claim 11 further comprising limiting current flowing from the power supply to the first component so that current delivered by the power supply to the first component is limited during the second time interval to a value less than 75% of the value of current received by the first component during the first time interval.

13. The method of claim 11 wherein the first component comprises an electromechanical device.

14. The method of claim 11 wherein the energy storage device is an ultra capacitor.

* * * * *